United States Patent [19]
Butler et al.

[11] Patent Number: 6,079,766
[45] Date of Patent: Jun. 27, 2000

[54] DURABLE DOORS FOR A RECREATIONAL VEHICLE

[75] Inventors: Michael Robert Butler, Temecula; Francisco P. Perez, Romoland, both of Calif.

[73] Assignee: National RV, Inc., Perris, Calif.

[21] Appl. No.: 09/073,669

[22] Filed: May 6, 1998

[51] Int. Cl.$^7$ ................................. B62D 25/04
[52] U.S. Cl. ................... 296/146.5; 296/901; 296/146.6
[58] Field of Search ................ 296/901, 146.5, 296/191, 37.1, 146.6; 52/502

[56] References Cited

U.S. PATENT DOCUMENTS

| | | |
|---|---|---|
| 999,533 | 8/1911 | Weitzel . |
| 2,871,056 | 1/1959 | Levitt . |
| 3,634,971 | 1/1972 | Kesling . |
| 3,838,881 | 10/1974 | Hill ........................................ 296/191 |
| 3,950,894 | 4/1976 | DiMaio . |
| 3,981,102 | 9/1976 | Harwood et al. . |
| 3,985,175 | 10/1976 | Pukl . |
| 4,053,972 | 10/1977 | Kordes . |
| 4,185,418 | 1/1980 | Markus . |
| 4,300,315 | 11/1981 | Holzwarth . |
| 4,306,381 | 12/1981 | Presto ............................... 296/146.5 X |
| 4,564,232 | 1/1986 | Fujimori et al. ..................... 296/901 X |
| 4,589,240 | 5/1986 | Kendall et al. . |
| 4,635,421 | 1/1987 | Newberg . |
| 4,685,722 | 8/1987 | Srock ............................... 296/146.6 X |
| 4,822,098 | 4/1989 | Vogt et al. ............................ 296/146.5 |
| 4,831,710 | 5/1989 | Katoh et al. ....................... 296/146.5 X |
| 4,881,346 | 11/1989 | Block . |
| 4,896,458 | 1/1990 | McKann et al. . |
| 4,906,033 | 3/1990 | Sargent et al. ...................... 296/37.1 X |
| 4,919,470 | 4/1990 | Muller ................................. 296/901 X |
| 4,945,682 | 8/1990 | Altman et al. .................... 296/146.5 X |
| 5,000,997 | 3/1991 | Ritchie et al. ....................... 296/191 X |
| 5,074,087 | 12/1991 | Green . |
| 5,172,519 | 12/1992 | Cooper ............................... 296/37.1 X |
| 5,192,108 | 3/1993 | Richardson et al. .................... 296/37.1 |
| 5,288,356 | 2/1994 | Benefiel .............................. 296/191 X |
| 5,325,648 | 7/1994 | Menard . |
| 5,369,901 | 12/1994 | Revlett . |
| 5,446,999 | 9/1995 | Inaba et al. ....................... 296/146.5 X |
| 5,528,865 | 6/1996 | Johnson et al. . |
| 5,644,870 | 7/1997 | Chen . |
| 5,667,868 | 9/1997 | Freeman .............................. 296/191 X |
| 5,746,466 | 5/1998 | Antos et al. .......................... 296/37.1 |
| 5,762,394 | 6/1998 | Salmonowicz et al. ............ 296/901 X |
| 5,857,732 | 1/1999 | Ritchie ................................ 296/901 X |

Primary Examiner—Joseph D. Pape
Attorney, Agent, or Firm—Oppenheimer Wolff & Donnelly LLP

[57] ABSTRACT

Doors for recreational vehicles, such as compartment doors and entry doors, involving a door construction having an exposed panel and an inner panel which have large surface areas of thermal contact between the two panels, where the exposed panel is made of a material such as plastic having a similar coefficient of thermal expansion as the inner panel. Accordingly, the exposed panel and the inner panel expand and contract at similar rate, when exposed to temperature variations, thereby minimizing any possible distortion between the two panels. Additionally, structural members such as stiffeners may be interposed between the exposed panel and the inner panel to preclude the bowing and/or distortion on the door. Furthermore, the outer surface of the exposed panel may have a layer of ultra-violet protection material to guard the door against the harmful effects of ultra-violet sunlight. The door assembly may then be bonded by beads of adhesives strategically placed between the exposed panel, the inner panel, and the stiffeners, to permit the assembled door to expand and contract more freely with minimal bowing and/or distortion.

21 Claims, 5 Drawing Sheets

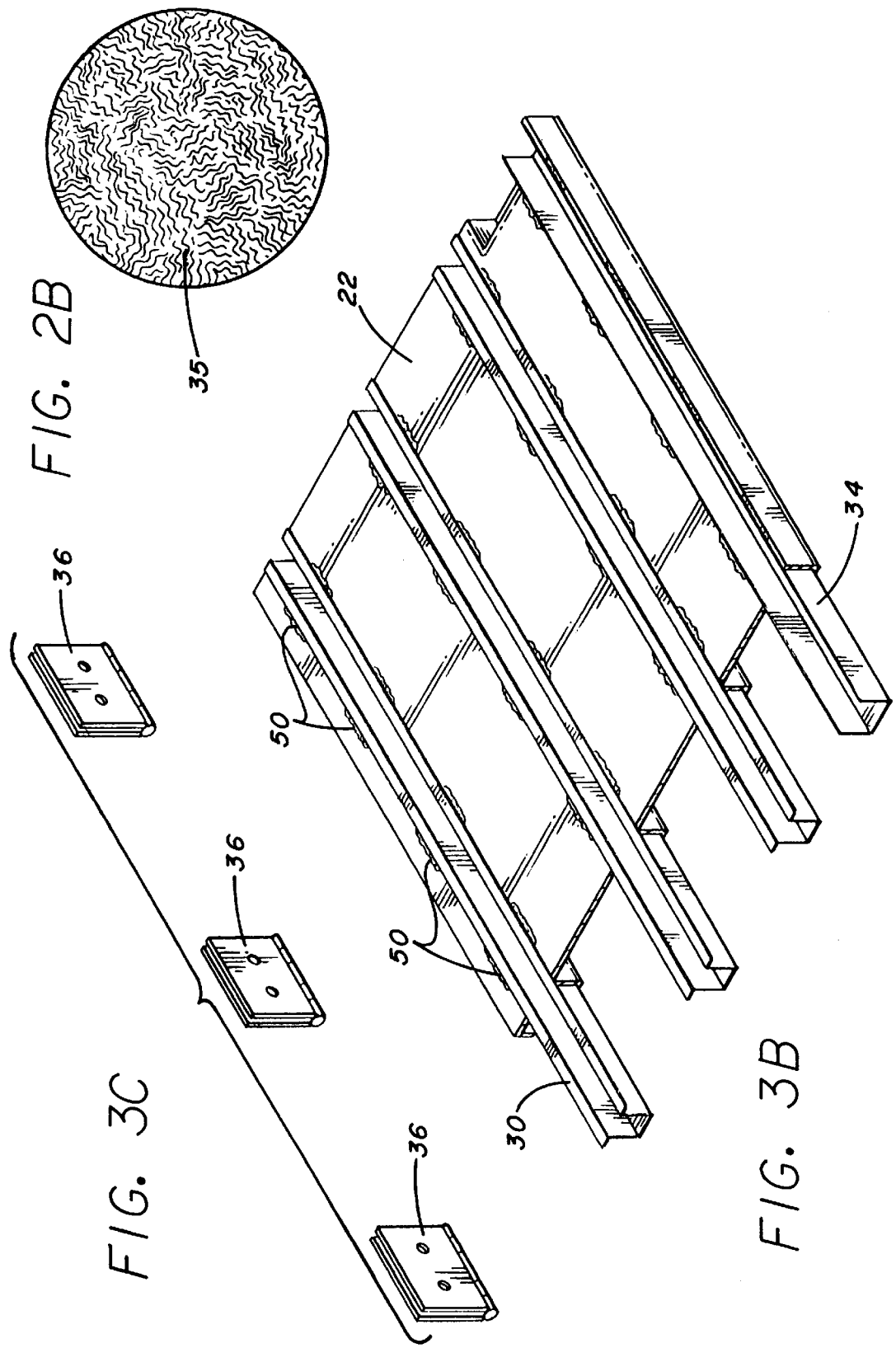

DURABLE DOORS FOR A RECREATIONAL VEHICLE

FIELD OF THE INVENTION

The present invention relates generally to doors for recreational vehicles and, more particularly, to an improved compartment door and entry door construction.

BACKGROUND

Doors for a recreational vehicle, such as the compartment doors and the entry door, are integral components to the overall body construction of the recreational vehicle. The compartment doors, for example, are generally located along the bottom perimeter of the vehicle structure and they form the side skirts of the vehicle. The entry door once it is closed, also serve as a side panel of the vehicle. The location of these doors, however, subject the doors to variety of damaging elements, such as flying rocks from the tires, road debris, scratches, door dents, rain, snow, and the harmful effects of ultra-violet sunlight. As a result, after a period of use, these doors will deteriorate, thereby adversely affecting the overall appearance of the recreational vehicle.

Furthermore, recreational vehicles are designed and intended to travel long distances, where the surrounding temperature may vary widely. As the temperature varies, however, the exposed panel (outer surface) of the door is subject to greater temperature variations then the inner panel, thereby causing the exposed panel and the inner panel to expand and contract at different rates. As a result, under such circumstances the compartment doors and entry door may bow and/or distort, causing the doors to crack and deteriorate during these cycles of expansion and contraction.

Commercially, a variety of materials are used to manufacture these doors. One such material is fiberglass. However, there are number of shortcomings with use of fiberglass. For example, fiberglass is highly susceptible to hair line scratches and dents, which may be readily visible to a casual viewer. In addition, after some use, the finished surface of the fiberglass will fade and look chalky or discolored due to the damaging effects of ultra-violet sunlight. Using fiberglass can also be very expensive because one mold can only produce two to three parts per day. Using fiberglass is also hazardous to the environment because in order to produce a smooth surface, the surface area must be buffed, releasing dust from fiberglass into the atmosphere. Additionally, a layer of GELCOAT-resin is generally applied over the surface area of the fiberglass for protection, but during this process vapors of GELCOAT-resin are emitted into the atmosphere creating problems to the environment and the operators working near the area.

Aluminum is also used to manufacture doors for recreational vehicles, but here too there are number of shortcomings. For example, design versatility is limited with aluminum, and adding curves or ribs to shape a sheet of aluminum is relatively expensive compared to plastics. Also, with aluminum, the aluminum door has to be painted to match the overall color of the recreational vehicle, whereas with plastics it can be color coordinated to match the color of the recreational vehicle. Aluminum is also highly susceptible to dents and scratches. And the relative high cost of aluminum makes the overall cost of manufacturing these door with aluminum very expensive.

Alternatively, manufacturers in the past have tried using an acrylonitrile-butadiene-styrene (hereinafter ABS) plastic composite material to manufacture the compartment doors, however, with this material, a noticeable distortion occurred on the face of the door due to the expansion and contraction characteristics of the ABS plastic when exposed to varying degrees of hot and cold temperatures. This characteristic prevented manufactures from taking advantage of its preferred qualities over other materials, such as resistance to superficial scratches, high impact resistance, durability against chalking or discoloration, design versatility, environmentally being clean, holding tight dimensional tolerances, and lower production cost.

For the foregoing reasons, there is a need for durable doors for a recreational vehicle that do not bow and/or distort under varying temperatures, which is durable against scratches, dents, and discoloration, and which also reduces the production cost of these doors.

SUMMARY

Accordingly, a general object of this invention is to provide durable doors for a recreational vehicle without the aforementioned problems. Viewed broadly, the present invention relates generally to a variety of doors for a recreational vehicle that have the following characteristics: (1) high resistance to superficial scratches; (2) high impact resistance; (3) durable against chalking or discoloration; (4) design versatility; (5) environmental friendliness; (6) holding close dimensional tolerance with consistency; (7) reducing the production cost of these doors; (8) reducing the replacement cost of the doors, and (9) avoiding the bowing and/or distortion of the doors as the doors expand and contract during the cycles of temperature variations.

In order to accomplish these and other objectives, an exemplary door includes an exposed panel and an inner panel having good thermal conduction, provided, for example, by large surface areas of thermal contact between the two panels, where the exposed panel is made of a material such as plastic having a similar coefficient of thermal expansion as the inner panel. Accordingly, the exposed panel and the inner panel expand and contract at similar rate, thereby minimizing any possible distortion between the two panels.

Preferably, the exemplary door also includes an ultra-violet protection layer on the outer surface of the exposed panel to protect the door from the harmful effects of ultra-violet radiation included in sunlight. Additionally, structural members such as stiffeners are preferably interposed between the exposed panel and the inner panel to further stiffen the door to preclude the bowing and/or distortion of the door during temperature variations. The exposed panel and the inner panel are also preferably made of ABS plastic to resist against scratches, dents, and to reduce the cost of manufacturing these doors. Furthermore, the exposed panel, the inner panel, and the structural layer are preferably bonded by a plurality of adhesive beads running longitudinally and continuously within the panels. These beads are strategically placed to allow the bonded door to expand and contract without distorting or warping on the face of the door. Alternatively, a plurality of snap pins may be used to couple the panels and structural layer, and again located strategically along the panels to allow the coupled door to expand and contract without distorting.

These and other objects, features and advantages will become apparent from consideration of the following detailed description and from the accompanying drawings.

BRIEF DESCRIPTION OF THE DRAWINGS

FIG. 2B is an enlarged view of a surface area of the encircled area of FIG. 2A;

FIG. 3B is an underside view of an inner panel showing the placement of a plurality of beads of adhesive;

FIG. 3C is an embodiment of another type of hinges;

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

Figure 1:
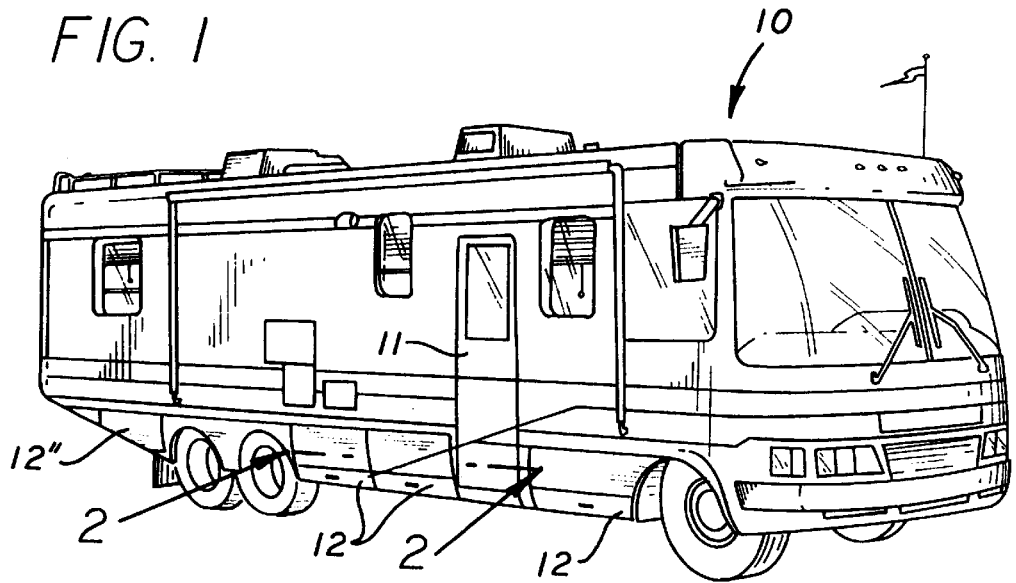
FIG. 1 is a perspective view of an exemplary recreational vehicle showing a plurality of compartment doors along the bottom of the vehicle and an entry door on the front right side of the vehicle.

FIG. 1 shows an exemplary recreational vehicle 10 (hereinafter RV 10), which has a plurality of compartment doors 12 located along the bottom perimeter of the RV 10, and an entry door 11 on the front right side of the RV 10. The compartment doors 12 and the entry door 11 are integral components of the overall body construction of the RV 10, as these doors form the side skirts and the front right side panel of the RV 10, respectively. The compartment doors 12 and the entry door 11 are also within the eye level view of most casual observers and consumers, so it is important that these doors are durable against damaging elements, such as flying rocks from the tires, road debris, scratches, door dents, rain, snow, and the harmful effects of ultra-violet sunlight. Furthermore, the faces of the doors 11 and 12 must appear smooth, and not bowed or distorted as the doors expand and contract when subject to temperature variations.

Figure 3A:
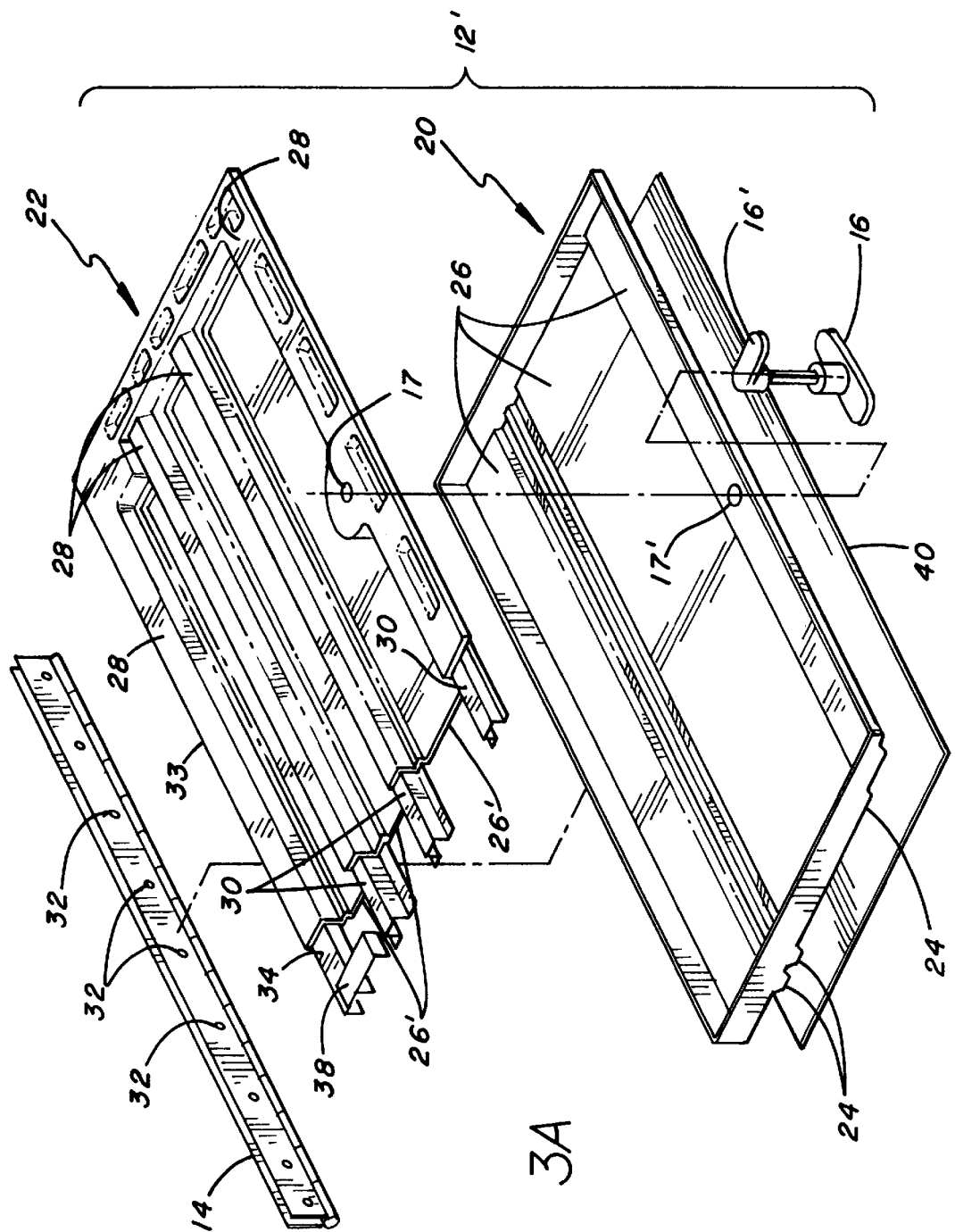
FIG. 3A is an expanded perspective view of an exemplary compartment door.

As illustrated by way of example in FIG. 3A, in accordance with one embodiment of the present invention, a compartment door 12', which is one of the plurality of compartment doors 12, includes an exposed panel 20 that mates with an inner panel 22. The exposed panel 20 in this embodiment is configured with a plurality of longitudinal ribs 24 in order to match the overall body contour design of the RV 10, and incidentally to stiffen the exposed panel 20 against bowing and/or distortion caused by the stress of contraction or expansion of the door 12'. Additionally, the interior side of the exposed panel 20 preferably has a plurality of large surface areas 26 in between the plurality of ribs 24. In this embodiment, the large surface areas 26 are substantially planar.

FIG. 3A shows the inner panel 22 preferably having a plurality of ridges 28. The ridges 28 are configured to further stiffen the inner panel 22 against bowing and/or distortion. In other word, the stiffness of the inner panel 22 is further increased by the ridges 28 to resist against bending and compression stress. At the same time, the ridges 28 are also adapted to hold a plurality of stiffeners 30 and 34, if necessary, to further resist the bowing and/or distortion on the panels. Between the ridges 28, the inner panel 22 also has a plurality of large surface areas 26' which mate with the large surface areas 26 of the exposed panel 20. It should be noted, the large surface areas of 26 and 26' are mirror image of each other and are configured to mate to each other so that the contact areas between the two surface areas 26 and 26' are maximized when assembled. Also, the exposed panel 20 and the inner panel 22 are designed to maximize the surface areas of 26 and 26', respectively, in order to maximize the contact areas between the two surfaces 26 and 26'. Accordingly, once the exposed panel 20 and the inner panel 22 are assembled, the large surface areas 26 and 26' form thermal contact between the two panels 20 and 22, so that efficient transfer of heat between the two panels are provided, thereby maintaining a substantial thermal equilibrium between the two panels. Thus, the assembled door 12' even at extreme temperatures will expand and contract without noticeable bowing and/or distortion, if any, because both of the panels 20 and 22 will expand and contract at similar rate. Good thermal conduction between the two panels may be achieved where the panels are coextensive, but spaced by a large member of high thermal conductivity stiffeners, by metal filled adhesives, or other known methods.

Additionally, as stated above, the inner panel 22 preferably includes the stiffeners 30 and 34 to further resist the bowing and/or distortion of the door 12'. In this embodiment, FIG. 3A shows three "hat" channels 30 and a "C" channel 34, the combination thereof having sufficient stiffness and the material strength to further resist the bending, compressional, tensional, and torsional stresses due to the contraction and/or expansion of the door 12' during the cycles of temperature variations. Alternatively, the stiffeners 30 may be shaped as a "C" channel, "I" channel, "L" channel, "Z" channel, or "T" channel, and the like, which have sufficient stiffness, cross-sectional area, and material strength to resist the stresses mentioned above or the combination thereof. Likewise, the "C" channel 34 may also be of different cross-section.

Although FIG. 3A shows total of four stiffeners, i.e., three "hat" channels 30 and one "C" channel 34, an alternative inner panel may be designed with a different combination of channels. For example, another embodiment (not shown) of the inner panel may have total of two stiffeners with one "hat" channel 30 and one "C" channel 34 along the opposite longitudinal edges of the inner panel. Yet another embodiment (not shown) may be similar as the previous embodiment, but with another "hat" channel 34 along the center of the inner panel, thereby having total of three stiffeners. Incidentally, with the above two embodiments, the inner panels would have greater surface areas to form thermal contacts between the inner panel and the exposed panel.

FIG. 3A also shows a long hinge 14 with a plurality of holes 32 to receive coupling devices, such as a plurality of screws (not shown) to pivotally mount the door 12' to the RV 10. Preferably, the channel 34 is provided along a first edge 33 of the inner panel 22 to provide backing structure for the door 12', so that the hinge 14 may be securely anchored to the door 12'. Incidentally, the long hinge 14 also provides support to the panel 12' to resist the bowing and/or distortion. Alternatively, as shown by way of example in FIG. 3C, a plurality of smaller hinges 36 may be used to pivotally mount the door 12' to the RV 10.

The door of FIG. 3A, further includes by way of example, a pair of short "L" members 38 (one shown) coupled to the ends of the "C" channel 34. The "L" sections 38 provides increased strength at the corners of the doors adjacent the hinges.

The exposed panel 20 and the inner panel 22 each have a hole 17 and 17', respectively. The holes 17 and 17' are aligned to each other in order to receive a locking handle 16, which is used to secure the door 12' to the RV 10. To assemble the locking device, the locking handle 16 is inserted into the holes 17 and 17' then a latching device 16' is coupled to the locking handle 16. Thereafter, as shown by way of example FIG. 4, the door is firmly secured to the RV 10 by a half turn of the handle 16, which causes the latching device 16' to clamp onto the body frame of the RV 10.

FIG. 3A also shows a layer of ultra-violet protection 40 preferably co-extruded onto the outer surface of the exposed panel 20, to guard against chalking or discoloration caused by the ultra-violet sunlight. Further details of the ultra-violet protection layer 40 will be discussed in the material section below.

Focus now turns to materials used to manufacture the door 12'. In this regard, plastic material, such as an acrylonitrile-butadiene-styrene (hereinafter ABS) is preferred to manufacture the exposed panel 20 and the inner panel 22. The ABS plastic material is preferred for the following qualities: (1) high resistance to superficial scratches; (2) resistance to dents inside and outside; (3) durable against chalking or discoloration; (4) design versatility to contour the surface of the doors to match the body configuration of the recreational vehicle; (5) environmental friendliness; (6) consistent dimensional tolerance; (7) lower production cost of the doors; and (8) lower replacement cost of the doors. It should be noted that other materials exhibiting similar qualities as above, may also be used to manufacture the door 12', for example, polycarbonate, expanded polypropylene, polyvinyl chloride and the like.

Figure 2A:
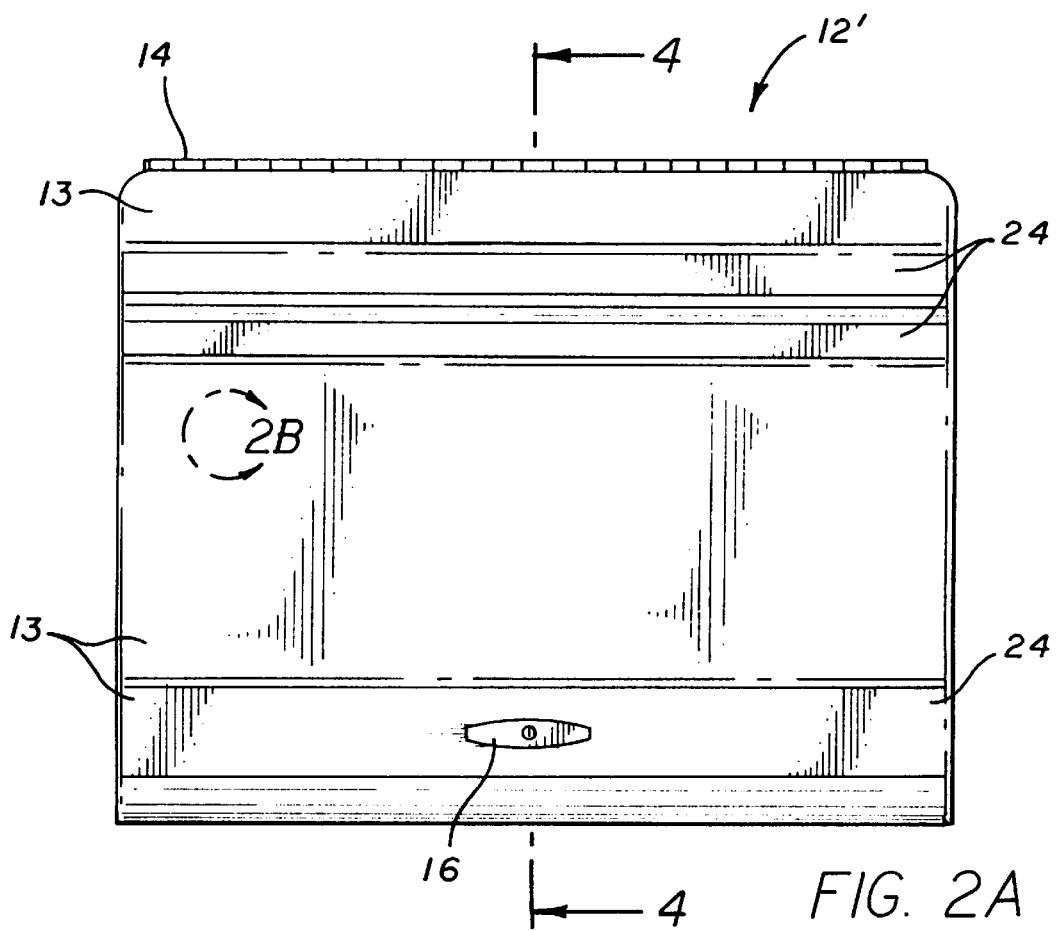
FIG. 2A is an enlarged front view of an exemplary compartment door with a hinge along the top edge of the door and a locking handle at the bottom center of the door.

Again, FIG. 3A shows the outer surface of the exposed panel 20 preferably having a layer of ultra-violet protection 40 (hereinafter UV layer 40) to guard against chalking or discoloration caused by ultra-violet sunlight. In this regard, the exposed panel 20 is preferably formed of 0.125 inch thick sheet of ABS-CENTREX plastic, which is thermal (vacuum formed) molded into the contour shape of the exposed panel 20 having a outer face that matches with the overall body contour design of the RV 10. For example, FIG. 2A shows an exemplary compartment door 12' with the outer face having a plurality of substantially planar surfaces 13 with the plurality of ribs 24 to match the overall body contour of the RV 10. It may be noted that the ABS-CENTREX sheet is commercially available with a co-extruded top coat layer of ultra-violet protection over the sheet of ABS plastic. The inner panel 22 is formed of 0.125 inch thick general purpose ABS sheet without the layer of ultra-violet protection, and this sheet is also formed into an intricate inner panel shape by thermal (vacuum formed) molding or the like. Again, the large surface areas of 26 and 26' are mirror images of each other and are configured to mate to each other so that the contact areas between the two surface areas 26 and 26' are maximized when assembled. Also the exposed panel 20 and the inner panel 22 are designed to maximize the surface areas of 26 and 26', respectively, in order to maximize the contact areas between the two surfaces 26 and 26'.

As stated above, one of the advantages with using plastic material such as ABS is the lower production cost. For example, one thermal mold can produce a panel every ten or fifteen minutes, and the thermal mold even at this production rate can last for over a year. At the same time, the thermal mold can consistently produce high quality panels that has close dimensional tolerances, so that less labor time is needed to machine the panels. Also, the scrap materials may be recycled and reused. Additionally, the ABS sheet may be precolor coordinated to match the body color of the RV, thereby eliminating the need for separately painting of the doors. And with thermal molding process the face of the panel may be contoured to match the overall body configuration of the recreational vehicle with minimal expense.

Furthermore, as shown in FIG. 2B (encircled area of FIG. 2A) by way of example, the surface finish of the exposed panel 20 preferably has hair cell finish 35, so that unavoidable scratches and dents are not readily noticeable to a casual observer. The hair cell finish 35 on the exposed panel 20 can be easily thermal molded with minimal cost.

On the other hand, with the fiberglass and aluminum, hair cell finish on the surface is not readily available. Also, a mold for a fiberglass can only produce two to three panels per day as compared with thirty or more ABS panels. Close dimensional tolerance is also difficult to achieve with fiberglass because operators' skill are heavily relied on to apply the right amount of protective layer, such as GELCOAT. Consequently, if too much protective layer is applied, then additional labor expense is needed to machine the fiberglass to remove the excess protective layer. Alternatively, with aluminum there is limited design versatility, and adding curves or ribs to match the overall body contour of the vehicle is relatively expensive. Additionally, aluminum doors require additional step of painting to match the overall color of the recreational vehicle.

The "hat" channels 30 and the "C" channel 34, as shown in FIG. 3A, are preferably composed of 20 gauge galvanized steel. These stiffeners 30 are strategically located longitudinally along the inner panel 22 to counteract the expansion and contraction of the door 12', during the cycles of temperature variations. Additionally, the combination of the stiffeners 30 and the channel 34 preferably have sufficient stiffness to counteract the bending stress on a door during the periods of contractions to preferably allow no more than 0.125 inch deflection along the surface area of the door. Although 0.25 inch deflection along the door may not be prominently noticeable to a casual observer, 0.125 inch deflection is still preferred to ensure aesthetically pleasing appearance. It should be noted that other materials may be used for the stiffeners, with such material being sufficient strength to resist the expansion and contraction of the door 12'. For example, the same material that is used to manufacture the panels 20 and 22 may be used to manufacture the stiffeners with ribs of sufficient stiffness to resist the bending stresses, and the sufficient material strength to resist the compressional and tensional stress from the expansion and contraction of the door 12'. Another alternative material for the stiffeners may be aluminum shaped in the variety of cross sections mentioned above.

To limit the deflection on the surface of the door to 0.125 inch, FIGS. 8 and 9 show the preferred cross-sectional dimensions of the "hat" channel 30 and the "C" channel 34, respectively, for the door 12' which has a width of 4 feet 2 inches and a height of 28½ inches. The channel 30 for the door 12' preferably has the following dimensions: W=1⅛ inches, H=⅞ inch, B=½ inch, and W'=1¾ inches. The "C" channel 34 for the door 12' preferably has the following dimensions: X=1¾ inches and Y=1 inch, 2=1⅛ inches.

Figure 4:
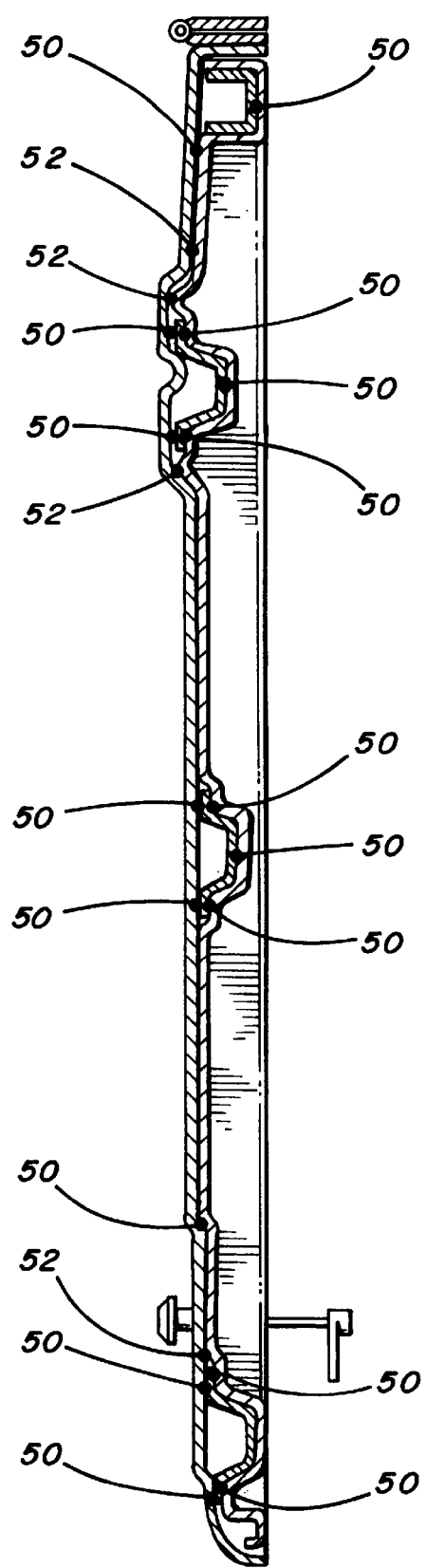
FIG. 4 is a cross-sectional view of an assembled compartment door showing the placement of a plurality of beads of adhesive to bond the compartment door together.
Figure 5:
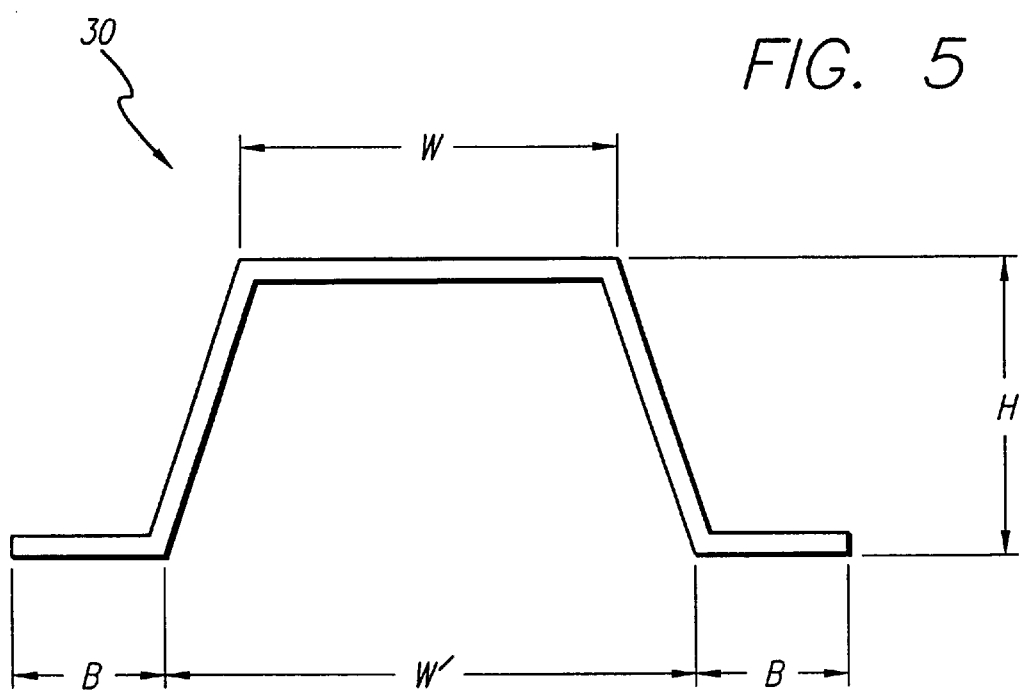
FIG. 5 is a cross-sectional view of a channel having a "hat" configuration.
Figure 6:
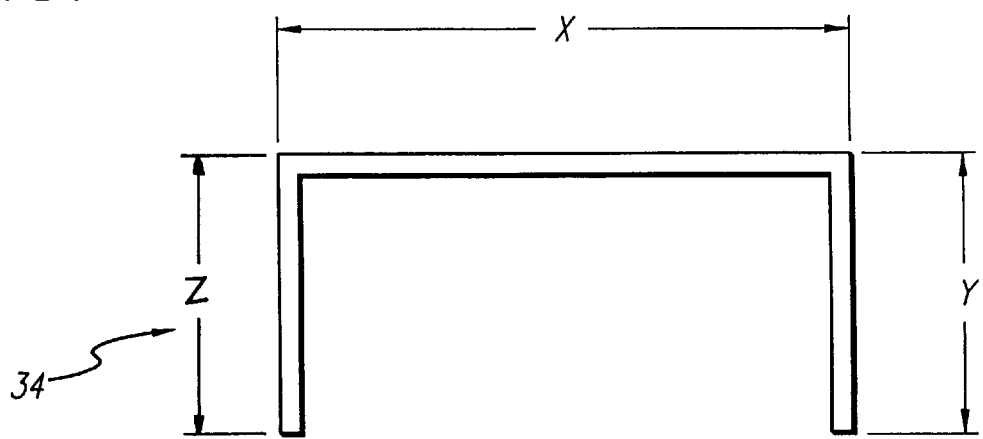
FIG. 6 is a cross-sectional view of a "C" channel.

As shown by way of example in FIGS. 3B and 4, in the preferred embodiment, adhesives are strategically placed between the exposed panel 20, inner panel 22, the stiffeners 30, and the channel 34 in order to bond the assembled door 12' together. More specifically, the adhesives are strategically placed to permit the assembled door 12' to freely expand and contract with minimal bowing and/or distortion on the door 12'. In this regard, as shown more clearly in FIG. 4, two types of adhesives are preferably used to bond the assembly together, first is a silicon base adhesive where a plurality of continuous ¼ inch beads 50 are placed between the stiffeners 30 and the inner panel 22, the channel 34 and the inner panel 22, and the stiffeners 30 and the exposed panel 20. Second is an ABS cement base adhesive where a plurality of continuous ¼ inch beads 52 are placed between the exposed panel 20 and the inner panel 22. As shown in FIG. 3B, both of the silicon adhesive 50 and the ABS cement 52 beads run parallel longitudinally but they are continuous. This design allows the exposed panel 20 and the inner panel 22 to expand and contract more freely without bowing and/or distorting, as further explained below.

As shown in FIG. 4, the combination of the silicon adhesive 50 and the ABS cement 52 base adhesives are used to optimize the overall performance of the door 12'. For instance, in the initial assembly process the silicon adhesive 50 and the ABS cement 52 are strategically placed between the exposed panel 20, the stiffeners 30, channel 34, and the inner panel 22, as described above, then the assembly is put under moderate pressure to bond the assembly together. Once the pressure is released, the ABS cement 52 due to its fast setting characteristics holds assembly together to ensure the assembly is held in proper placed until the silicon adhesive 50 sets. The ABS cement adhesive 52 also ensures proper thermal contact between the surface areas 26 and 26', so that most efficient transfer of heat occur between the two surfaces. The silicon base adhesive 50 is used more often for its elastic characteristic which allows the assembled door 12' to expand and contract more freely without the bending and/or distortion of the door 12'. Naturally, the areas where the adhesives are not applied also expand and contract freely at similar rates without the bending and/or distortion of the door 12'.

FIG. 2A shows the completed compartment door 12' with the outer face having the ribs 24, the long hinge 14 coupled to the top edge of the door 12' for pivotally mounting the door 12' to the RV 10, and the locking handle 16 for securing the door 12' to the RV 10. The face of the door 12' also has substantially planar surfaces 13 with the hair cell finish 32.

A sample door with similar dimensions as the door 12' was recently tested by the Polymers Division of Bayer Corporation, located 800 Worcester Street, Springfield, Mass. 01151. The test consisted of mounting the sample door to a boxed frame simulating the locked position of the door on a recreational vehicle. The surrounding temperature was then cycled from −40 degree Fahrenheit (F) to 140 degree F every 24 hours for thirty days, i.e. thirty cycles. Every day seven measurements were taken to observe for warping or distortion of the door, and the integrity of the door after multi-thermo-cycles. Preliminary results of the test showed promising results. For example, at 140 degree F, no significant dimensional changes occurred on the door, the changes varied from 0.0 to 0.04 inch (1 mm). At −40 degree F, which is beyond normal operating temperature of the door, there was greater change, but not a large change for the door of this size. The test showed, the center of the door bowed out 0.1 inch (2.5 mm) and the two ends bowed in 0.17 inch (4 mm).

Alternative to the adhesives, a variety of other methods may be used to couple or bond the assembly door 12' together. For example, a plurality of snap pins (not shown), commonly used in the auto industry to snap the side panels to the doors, may be used to couple the exposed panel 20 and the inner panel 22 together. Another example may be fasteners or rivets with a grip range to couple the panels together. Yet another alternative may be a ultra sound weld via sonic weld to fuse the two panels together, along with the stiffeners.

As shown by way of example in FIG. 1, another embodiment of the present invention is an exemplary entry door 11, constructed similarly to the compartment door 12'. The entry door includes an exterior panel and an inner panel each having large surface areas. As in the door 12', the large surface areas are in thermal contact to provide efficient transfer of heat between the two panels.

FIG. 1 shows yet another embodiment of the present invention, a compartment door 12" which is similar to the compartment door 12', but with a curved bottom edge.

In conclusion, it is to be understood that the foregoing detailed description and the accompanying drawings relate to the presently preferred illustrative embodiment of the invention. However, various changes may be made without departing from the spirit and scope of the invention. Thus, the disclosed examples are to illustrate the spirit and scope of the invention and are not to be considered limitations relative to the present invention. Additionally, the dimensions of the drawings are for the illustrative purpose only and they may not be proportional or exact.

What is claimed is:

1. In combination:

a recreational vehicle;

a plurality of doors adapted to be pivotally mounted on the recreational vehicle, each said door including:

(a) an exposed panel;

(b) an ultra-violet protection layer forming the outer surface of said exposed panel;

(c) an inner panel having a plurality of intermediate surface areas which are in extended thermal contact with said exposed panel to provide efficient transfer of heat between said exposed panel and inner panel and maintain said panels in substantial thermal equilibrium;

(d) wherein said exposed panel and inner panel are made of an acrylonitrile-butadiene-styrene plastic composite material;

(e) a plurality of longitudinally extending metal stiffeners in between said exposed panel and inner panel; and (f) a plurality of adhesive beads attaching said exposed panel both to said inner panel and to said plurality of stiffeners;

whereby said exposed panel and said inner panel are in direct thermal contact so that they expand and contract at similar rates at varying temperatures, to minimize the distortion of said compartment doors.

2. A door as defined in claim 1, wherein said exposed panel and said inner panel have a plurality of ridges for holding said plurality of stiffeners.

3. A plastic composite door adapted to be pivotally mounted on a recreational vehicle, comprising:

an exposed panel;

an inner panel having a plurality of intermediate surface areas which are generally coextensive with and having high thermal conductivity with respect to said exposed panel;

wherein said exposed panel is made of a plastic having a similar coefficient of thermal expansion as said inner panel;

at least one stiffener in between said exposed panel and inner panel; and a plurality of adhesive beads attaching said exposed panel to at least one stiffener, and to said inner panel;

wherein thermal conduction between said exposed panel, at least one stiffener, and inner panel provides efficient transfer of heat, whereby said exposed panel and said inner panel expand and contract at similar rate, to minimize distortion of said door.

4. A door as defined in claim 3, wherein said exposed panel has a layer ultra-violet protection material at the outer surface of said exposed panel.

5. A door as defined in claim 3, wherein said exposed panel and said inner panel are made of an acrylonitrile-butadiene-styrene plastic composite material.

6. A door as defined in claim 3, wherein at least one of said exposed panel and said inner panel have a plurality of ridges for holding said plurality of stiffeners in place in said door.

7. A door as defined in claim 3, wherein said door includes a hinge for pivotally mounting said door to said recreational vehicle.

8. A door for recreational vehicles, comprising:

an exposed panel;

an inner panel having a plurality of intermediate surface areas which are in thermal contact with said exposed panel; and wherein said exposed panel is made of a material having a similar coefficient of thermal expansion as said inner panel;

whereby said exposed panel and said inner panel expand and contract at similar rate, to minimize the distortion of said door.

9. A door as defined in claim 8, wherein said exposed panel has a layer ultra-violet protection material at the outer surface of said exposed panel.

10. A door as defined in claim 8, wherein said exposed panel and said inner panel are made of a plastic.

11. A door as defined in claim 10, wherein said plastic is an acrylonitrile-butadiene-styrene plastic composite material.

12. A door as defined in claim 8, wherein said inner panel has a plurality of ridges to stiffen said door.

13. A door as defined in claim 12, wherein a plurality of stiffeners are interposed along said plurality of ridges to stiffen said door.

14. A door as defined in claim 13, wherein said plurality of stiffeners are made of steel.

15. A door as defined in claim 8, wherein a hinge is coupled along the edge of said door to pivotally mount said door to said recreational vehicle.

16. A door as defined in claim 8, wherein a plurality of hinges are coupled along the edge of said door to pivotally mount said door to said recreational vehicle.

17. A door as defined in claim 13, wherein said exposed panel, said inner panel, and said plurality of stiffeners are bonded together by adhesives.

18. A door as defined in claim 17, wherein said adhesives are a plurality of continuous beads running longitudinally.

19. A door as defined in claim 8, wherein said door is a compartment door.

20. A door as defined in claim 8, wherein said exposed panel has hair cell finish.

21. A plastic composite door adapted to be pivotally mounted on a recreational vehicle, the plastic composite door comprising:

an exposed panel having an ultra-violet protection layer forming the outer surface of said exposed panel;

said exposed panel further having at least one hinge that is anchored to the top of said exposed panel;

said exposed panel further having at least one opening at the bottom of said exposed panel adapted to receive a locking handle;

an inner panel having a plurality of intermediate surface areas which are in extended thermal contact with said exposed panel to provide efficient transfer of heat between said exposed panel and said inner panel;

said inner panel further having at least one opening at the bottom of said inner panel that is aligned with said opening of the exposed panel, and said opening at the bottom of the inner panel is adapted to receive a latching device;

wherein said exposed panel and inner panel are made of acrylonitrile-butadiene-styrene plastic composite material;

a plurality of longitudinally extending metal stiffeners in between said exposed panel and said inner panel and said stiffeners extending substantially across said door;

said inner panel having longitudinally extending recesses which closely encompass said stiffeners for substantially the entire length of said stiffeners; and adhesive material attaching said exposed panel both to said inner panel and to said plurality of stiffeners, and also bonds said stiffeners to said inner panel;

whereby said exposed panel and said inner panel expand and contract at similar rates with varying ambient temperature, to minimize the distortion of said compartment doors.

* * * * *